US006843221B2

(12) United States Patent
McGee et al.

(10) Patent No.: US 6,843,221 B2
(45) Date of Patent: Jan. 18, 2005

(54) REDUCED EMISSIONS FUEL INJECTION CONTROL STRATEGY

(75) Inventors: Brian G. McGee, Chillicothe, IL (US); John P. Timmons, Chillicothe, IL (US); Mark E. Rettig, Peoria, IL (US)

(73) Assignee: Caterpillar, Peoria, IL (US)

(*) Notice: Subject to any disclaimer, the term of this patent is extended or adjusted under 35 U.S.C. 154(b) by 0 days.

(21) Appl. No.: 10/628,732

(22) Filed: Jul. 28, 2003

(65) Prior Publication Data

US 2004/0079325 A1 Apr. 29, 2004

Related U.S. Application Data

(60) Provisional application No. 60/420,722, filed on Oct. 23, 2002.

(51) Int. Cl.$^7$ ................................................. F02B 3/00
(52) U.S. Cl. ...................................... 123/299; 123/300
(58) Field of Search ................................ 123/299, 300, 123/294, 304, 305

(56) References Cited

U.S. PATENT DOCUMENTS

| | | | | |
|---|---|---|---|---|
| 6,386,176 B1 | * | 5/2002 | McGee | 123/299 |
| 6,453,874 B1 | * | 9/2002 | Duffy et al. | 123/446 |
| 6,470,849 B1 | * | 10/2002 | Duffy et al. | 123/299 |
| 6,516,773 B2 | * | 2/2003 | Dutart et al. | 123/299 |
| 6,659,071 B2 | * | 12/2003 | LaPointe et al. | 123/299 |
| 6,705,278 B2 | * | 3/2004 | McGee et al. | 123/299 |

* cited by examiner

Primary Examiner—John T. Kwon
(74) Attorney, Agent, or Firm—Clifton G Green

(57) ABSTRACT

Methods for operating a fuel injection device. A single fuel shot is delivered when rack is less than a first predetermined threshold. A first fuel shot and a second fuel shot is delivered when rack is above the first predetermined threshold and below a second predetermined threshold. A single fuel shot is delivered when rack is above a third predetermined threshold.

4 Claims, 2 Drawing Sheets

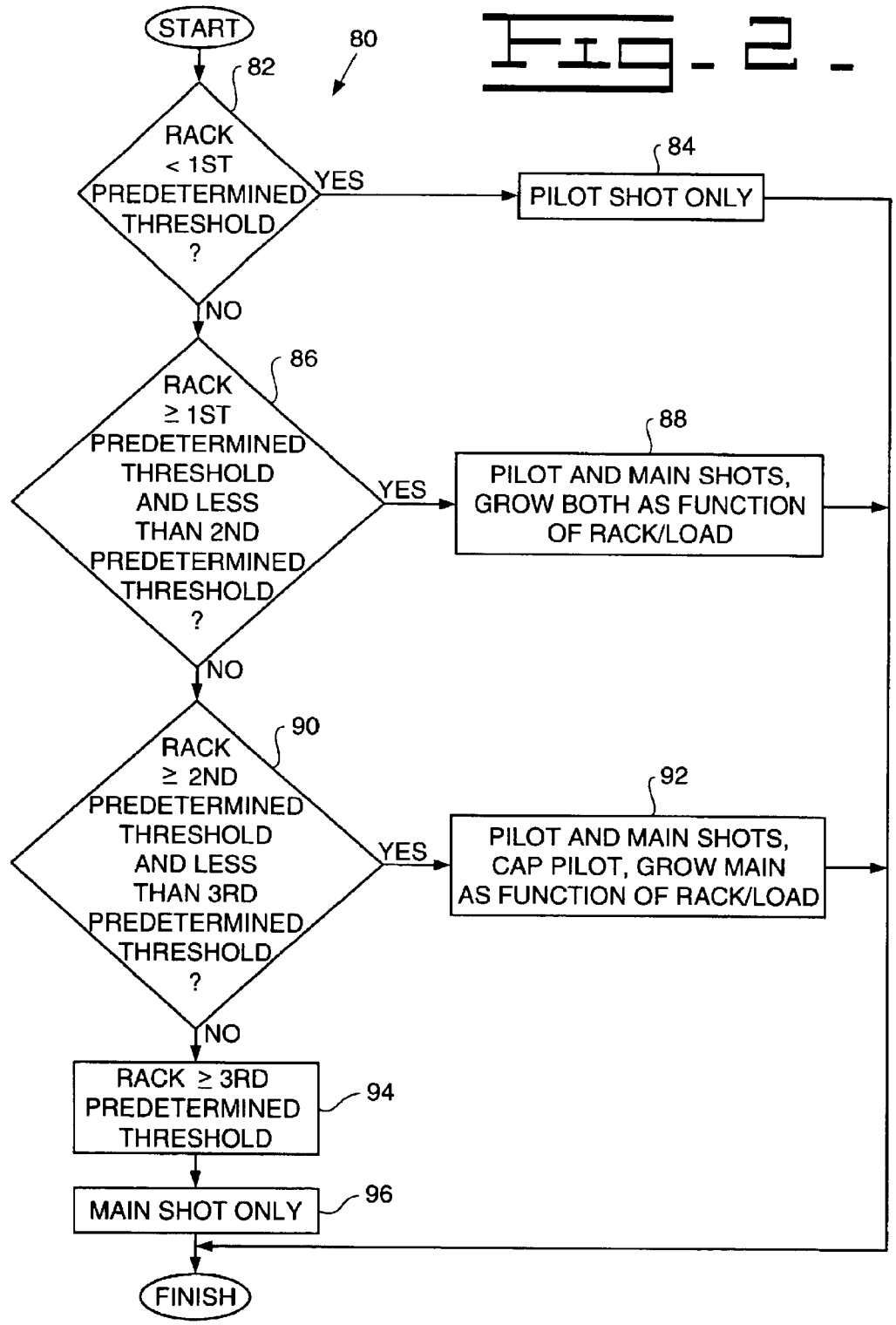

REDUCED EMISSIONS FUEL INJECTION CONTROL STRATEGY

This application claims the benefit of prior provisional patent application Ser. No. 60/420,722 filed Oct. 23, 2002.

TECHNICAL FIELD

This invention relates generally to fuel injection systems, and more particularly, to varying the number of shots of fuel per combustion cycle per cylinder as a function of rack.

BACKGROUND

Electronically controlled direct fuel injection devices such as electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an electronic fuel injection signal received from an electronic fuel injection control device (controller) or system. These signals include waveforms that are indicative of a desired injection rate as well as the desired timing and quantity of fuel to be injected into the cylinders.

Emission regulations pertaining to engine exhaust emissions are becoming more restrictive throughout the world including, for example, restrictions on the emission of hydrocarbons, carbon monoxide, the release of particulates, and the release of nitrogen oxides (NOx). Tailoring the electronic fuel injection current signal waveform and the resulting number of injections and the injection rate of fuel to a combustion chamber during a combustion cycle of the cylinder, as well as the quantity and timing of such fuel injections, is one way to improve emissions and meet higher emissions standards. As a result, multiple fuel injection techniques, wherein the electronic fuel injection signal waveform comprises a plurality of distinct fuel injection signals, have been utilized to modify the burn characteristics of the combustion process in an attempt to reduce emission and noise levels. Multiple fuel injections typically involve splitting the total fuel delivery to the cylinder during a particular injection event into separate fuel injections, such as a pilot injection, a main injection, and an anchor injection, where three injections of fuel (a three shot injection) are desired. Each of these injections may also be referred to generally as a shot, and the term shot as used in the art may also refer to the actual fuel injection or to the command current signal (electronic fuel injection current signal), also referred to simply as a fuel injection signal, to a fuel injector indicative of an injection or delivery of fuel to the engine. At different engine operating conditions, it may be necessary to use different injection strategies in order to achieve both desired engine performance and emissions control.

During normal operation of an engine, the injection strategies may change several times. Typically each injection strategy will differ slightly from the other injection strategies in both the level of noise and amount of torque produced. In some instances, the transition from one strategy to another may cause a noticeable "step-change" in either or both of these characteristics and/or other characteristics. This sudden change in characteristics is often undesirable.

SUMMARY OF THE INVENTION

The present invention provides methods for operating a fuel injection device. A single fuel shot is delivered when rack is less than a first predetermined threshold. A first fuel shot and a second fuel shot is delivered when rack is above the first predetermined threshold and below a second predetermined threshold. A single fuel shot is delivered when rack is above a third predetermined threshold.

BRIEF DESCRIPTION OF THE DRAWINGS

FIG. 2 shows a flowchart for operating the fuel injection system according to one embodiment of the invention.

DETAILED DESCRIPTION

Figure 1:
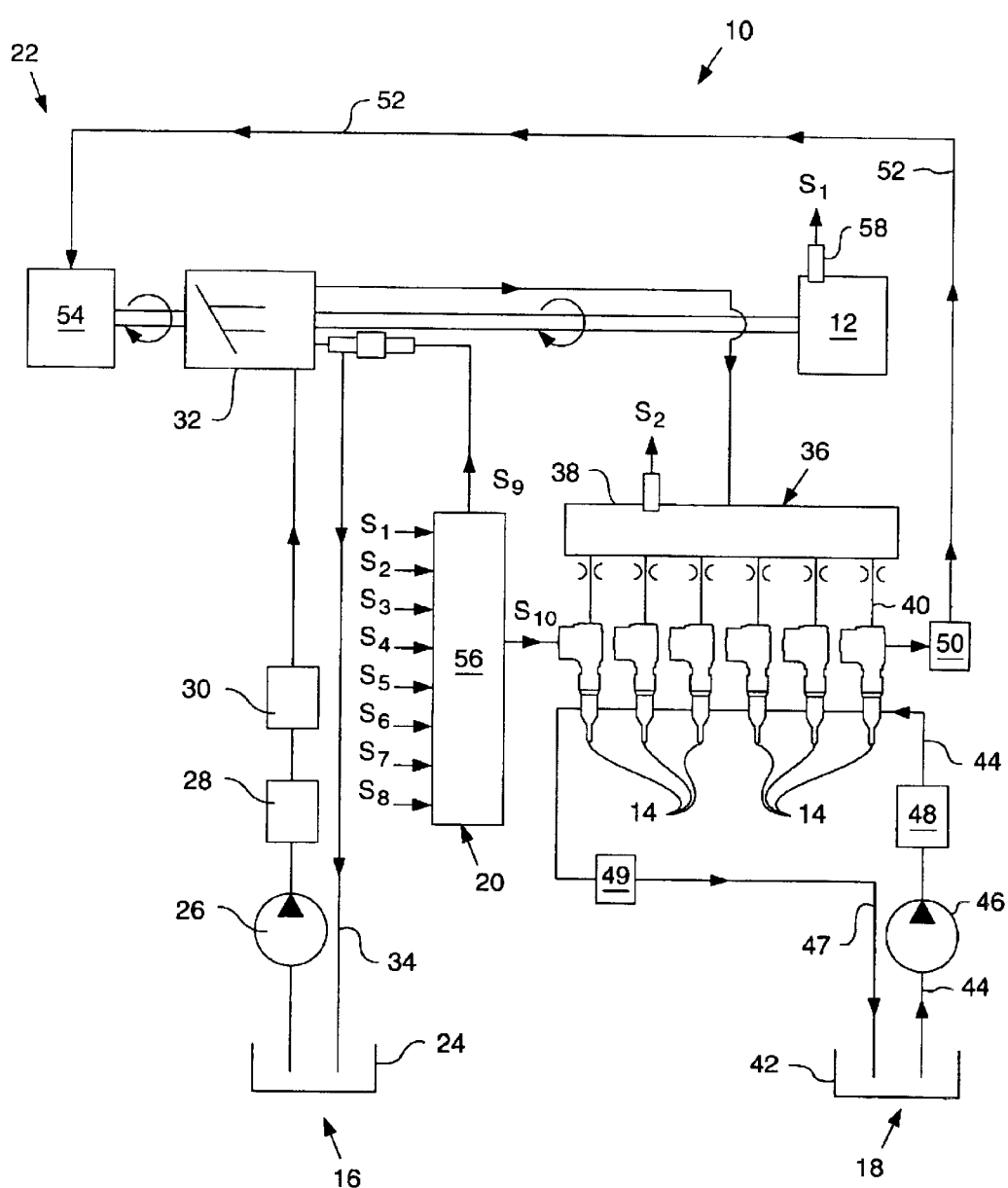
FIG. 1 shows a functional block diagram of a hydraulically actuated electronically controlled fuel injection system 10 according to one embodiment of the invention as adapted for a direct-injection compression ignition engine.

As used throughout this disclosure, an "injection event" is defined as the injections that occur in a particular cylinder or combustion chamber during one cycle of the engine ("cylinder cycle"). For example, one cycle of a four stroke engine for a particular cylinder, includes an intake, compression, expansion, and exhaust stroke. Therefore, the injection event/cylinder cycle in a four stroke engine includes the number of injections, or shots, that occur in a cylinder during the four strokes of the piston. As used in the art, and throughout this disclosure, an "engine operating cycle" or "engine cycle" includes the individual cylinder cycles for the cylinders included therein. For example, an engine cycle for a six cylinder engine will include six individual cylinder cycles, one for each of the cylinders of the engine (with each cylinder cycle having four strokes, for a total of 24 strokes). Generally, the cylinder cycles overlap, so that the beginning of the next successive cylinder cycle of a particular cylinder might begin prior to the completion of the beginning of the next engine operating cycle. The term "shot" as used in the art may also refer to the actual fuel injection or to the command electronic fuel injection current signal (electronic fuel injection current signal), also referred to simply as a fuel injection signal, to a direct fuel injection device, fuel injector or other fuel actuation device indicative of an injection or delivery of fuel to the engine.

FIG. 1 shows a functional block diagram of a hydraulically actuated electronically controlled fuel injection system 10 according to one embodiment of the invention as adapted for a direct-injection compression ignition engine 12. Fuel system 10 includes one or more electronically controlled fuel injection devices, such as a fuel injector 14, which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any number of cylinders or combustion chambers (not shown). In addition, while the embodiment of FIG. 1 also illustrates a hydraulically actuated electronically controlled fuel injector system, it is likewise recognized and anticipated that the present invention is equally applicable to other types of fuel injection devices, including electronically controlled injectors, mechanically actuated electronically controlled injector units as well as fluid activated common rail type fuel injection systems with digitally controlled fuel valves. The fuel system 10 of FIG. 1 includes an apparatus or means 16 for supplying actuation fluid to each injector 14, an apparatus or means 18 for supplying fuel to each injector, electronic control means 20 for controlling the fuel injection system, including the manner and frequency in which fuel is injected by the injectors 14, for example, including timing, number of injections per injection event, fuel quantity per injection, time delay between each injection, and the injection profile. The fuel injection system 10 may also include apparatus or means 22 for recirculating actuation fluid and/or recovering hydraulic energy from the actuation fluid leaving each injector 14.

The actuating fluid supply apparatus or means 16 preferably includes an actuating fluid sump or reservoir 24, a relatively low pressure actuating fluid transfer pump 26, an actuating fluid cooler 28, one or more actuation fluid filters 30, an actuation fluid high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high-pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131.

Apparatus 22 may include a waste accumulating fluid control valve 50 for each injector (only shown by way of example), a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering apparatus or means 22. A portion of the recirculated actuation fluid is channeled to high-pressure actuation fluid pump 32 and another portion is returned to actuation fluid sump 24 via recirculation line 34.

In one embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel or some other type of suitable liquid.

The fuel supply apparatus or means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, also referred to as a controller, the use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory, which may be a RAM, a ROM, or other type of memory known in the art is connected to the microcontroller or microprocessor and stores instruction sets, maps, lookup tables, variables, and more. This memory may be referred to generally as a data storage. ECM 56 or a portion thereof may be used to control many aspects of fuel injection, including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) electrical current level of the injector waveform, and (10) any combination of the above parameters. Hence, the ECM 56 or a portion thereof will also be referred to as an electronic fuel injection control device or electronic fuel injection control system. Each of the described parameters are variably controllable independent of engine speed and load. ECM 56 receives a plurality of sensor input signals S1–S8 which correspond to known sensor inputs, such as engine operating conditions including engine speed, engine temperature, pressure of the actuation fluid, cylinder piston position and so forth, that are used to determine the desired combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor produces a signal designated by S1 in FIG. 1 and is inputted to ECM 56 over line S1. In the particular example illustrated in FIG. 1, ECM 56 issues control signal S9 to control the actuation fluid pressure from pump 32 and a fuel injection signal S10 to energize a solenoid or other electrical actuating device within each fuel injector 14 thereby controlling fuel control valves within each injector 14 and causing fuel to be injected into each corresponding engine cylinder. Each of the injection parameters are variably controllable, independent of engine speed and load. In the case of the fuel injectors 14, control signal S110 is a fuel injection signal that is an ECM commanded current to the injector solenoid or other electrical actuator.

FIG. 2 shows a flowchart 80 for operating the fuel injection system 10 according to one embodiment of the invention. In block 82 the rack, e.g., fuel quantity to be delivered to the engine 12, or load is compared with a first predetermined threshold, such as a no-load line. Generally rack and load are proportional to each other, and may be used interchangeably. For purposes of simplicity, however, the term rack will be used.

Typically the first predetermined threshold represents a rack below which the engine 12 is assumed to be operating under "no-load" conditions. The term "no-load" is understood to be a term of art within the industry, and will not be defined further herein for purposes of brevity. Further, the no-load line is typically a function of engine speed, rather than a static value.

When the rack is less than the first predetermined threshold, control passes to block 84. Otherwise control passes to block 86.

In block 84, the fuel injection strategy is commanded to a "pilot shot only" mode, e.g., a single pilot shot is delivered for each injection event. Typically the pilot shot will be delivered at a crank angle of about 30–5 degrees before top dead center ("BTDC"), although other values may also be used as appropriate. Because only a single fuel shot is delivered in this mode, as rack increases, so does the quantity of fuel in the pilot shot.

In block 86, the rack is compared with a second predetermined threshold, such as a minimum fuel quantity needed to allow two shots. If the rack is greater than or equal to the second predetermined threshold, control passes to block 88. Otherwise, control passes to block 90.

Typically the second predetermined threshold is selected to be the minimum rack that allows for two controllable fuel shots per injection cycle. Although theoretically the second predetermined threshold can be any positive, non-zero number, as a practical matter this is not so. All fuel delivery devices, such as fuel injectors, have inherent tolerances built into them for a minimum fuel delivery quantity, or a minimum fuel delivery quantity capable of being repeated. Thus, as a practical matter, in some embodiments of the invention, the second predetermined threshold may be no smaller than twice the minimum fuel delivery quantity capable of being repeated.

Further, there may be emissions advantages to using two shots instead of one. Therefore, it may be desirable to make the second predetermined threshold as low as possible, although in other embodiments it need not be.

In block 88, the fuel quantity, e.g., rack, to be delivered to a particular cylinder is divided into a pilot shot and a main shot. Typically the pilot shot will be delivered at about 30-5 BTDC, and the main shot will be delivered at about 10 degrees BTDC to about 10 degrees after top dead center ("ATDC"). Other crank angle timings may also be used as appropriate.

In block 88, the fuel quantity for both the pilot shot and the main shot grow as a function of rack.

In block 90, the rack is compared to the second predetermined threshold. If the rack is greater than or equal to the second predetermined threshold and less than a third predetermined threshold, control passes to block 92. Otherwise, control passes to block 94.

In block 92, the fuel quantity, e.g., rack, to be delivered to a cylinder is divided into a pilot shot and a main shot, similar to that of block 88. However, unlike block 88, in block 92 the quantity of fuel to be delivered in the pilot shot is capped at some amount, and does not increase as rack increases. The amount of fuel that the pilot shot is capped at may be a matter of choice, and may vary depending on the operating characteristics, e.g. torque output, emissions, and fuel consumption, of the engine 12 that are desired.

In block 94, the rack is compared to a third predetermined threshold. In embodiments of the invention, this block may be omitted, since by appropriate selections of the first, second and third predetermined thresholds, if the answer to block 90 is "NO", then the answer to block 94 is automatically "YES". Control then passes to block 96.

In block 96, the fuel injection strategy is commanded to a "main shot only" mode, e.g., a single main shot is delivered for each injection event. Typically the main shot will be delivered at a crank angle of about 10 BTDC to 10 ATDC, although other values may also be used as appropriate. Because only a single fuel shot is delivered in this mode, as rack increases, so does the quantity of fuel in the main shot.

The flowchart 80 may then be repeated as desired.

INDUSTRIAL APPLICABILITY

The above techniques may be used to balance the operating characteristics of the engine 12 to achieve appropriate emissions output over a wide range of rack and engine speeds.

From the foregoing it will be appreciated that, although specific embodiments of the invention have been described herein for purposes of illustration, various modifications may be made without deviating from the spirit or scope of the invention. Accordingly, the invention is not limited except as by the appended claims.

What is claimed is:

1. A method for operating a fuel injection device, comprising:
   delivering a single fuel shot when rack is less than a first predetermined threshold;
   delivering a first fuel shot and a second fuel shot when rack is above the first predetermined threshold and below a second predetermined threshold;
   delivering a single fuel shot when rack is above a third predetermined threshold.

2. A method for operating a fuel injection device, comprising:
   delivering a single first fuel shot when rack is less than a first predetermined threshold, the first fuel shot being delivered at a crank angle of about 30–5 BTDC;
   increasing the quantity of the fuel in the first fuel shot as rack increases below the first predetermined threshold;
   delivering the single first fuel shot and a single second fuel shot when rack is greater than or equal to the first predetermined threshold, the first fuel shot being delivered at a crank angle of about 30–5 BTDC and the second fuel shot being delivered at a crank angle of about 10 BTDC–10 ATDC;
   increasing the quantity of the fuel in the first fuel shot and the second fuel shot as rack increases above the first predetermined threshold and below a second predetermined threshold;
   increasing the quantity of the fuel in the first fuel shot and the second fuel shot as rack increases above the first predetermined threshold and below a second predetermined threshold;
   capping the first fuel shot at predetermined quantity as the rack increases above the first predetermined threshold; and
   delivering only the second fuel shot when rack is greater than or equal to a third predetermined threshold.

3. A method for operating a fuel injection device, comprising:
   delivering a single fuel shot when rack is less than a first predetermined threshold;
   delivering a first fuel shot and a second fuel shot when rack is above the first predetermined threshold and the first fuel shot quantity is below the second predetermined threshold;
   delivering a first fuel shot equal to the second predetermined threshold and a second fuel shot when rack is above the first predetermined threshold and below a third predetermined threshold;
   delivering a single fuel shot when rack is above a third predetermined threshold.

4. A method for operating a fuel injection device, comprising:
   delivering a single first fuel shot when rack is less than a first predetermined threshold, the first fuel shot being delivered at a crank angle of about 30–5 BTDC;
   increasing the quantity of the fuel in the first fuel shot as rack increases below the first predetermined threshold;
   delivering the single first fuel shot and a single second fuel shot when rack is greater than or equal to the first predetermined threshold, the first fuel shot being delivered at a crank angle of about 30–5 BTDC and the second fuel shot being delivered at a crank angle of about 10 BTDC–10 ATDC;

increasing the quantity of the fuel in the first fuel shot and the second fuel shot as rack increases above the first predetermined threshold and the first shot quantity of fuel is below a second predetermined threshold;

capping the first fuel shot at the second predetermined quantity as the rack increases above the first predetermined threshold but below the third predetermined threshold; and delivering only the second fuel shot when rack is greater than or equal to a third predetermined threshold.

* * * * *